United States Patent [19]

Tomita

[11] Patent Number: 4,639,816

[45] Date of Patent: Jan. 27, 1987

[54] MAGNETO-OPTICAL RECORDING MEDIUM

[75] Inventor: Yasuo Tomita, Yokohama, Japan

[73] Assignee: Canon Kabushiki Kaisha, Tokyo, Japan

[21] Appl. No.: 535,698

[22] Filed: Sep. 26, 1983

[30] Foreign Application Priority Data

Sep. 27, 1982 [JP] Japan ............................ 57-168123
Sep. 27, 1982 [JP] Japan ............................ 57-168121
Sep. 27, 1982 [JP] Japan ............................ 57-168122

[51] Int. Cl.⁴ .......................... G11B 5/74; G11B 23/00
[52] U.S. Cl. .................................. 360/131; 428/694; 428/900
[58] Field of Search .................. 360/131, 134–135; 365/122; 428/900, 692, 694

[56] References Cited

U.S. PATENT DOCUMENTS 4,390,600  6/1983  Ohta et al. ........................ 428/621
4,412,264  10/1983  Imamura et al. .................... 360/131

Primary Examiner—John H. Wolff
Attorney, Agent, or Firm—Fitzpatrick, Cella, Harper & Scinto

[57] ABSTRACT

This specification discloses a magneto-optical recording medium, comprising a substrate; a magnetic film formed on the substrate and having an axis of easy magnetization perpendicular to the film surface; and an arrangement for establishing a reflection factor of not more than 10% at the surface of the magnetic film.

6 Claims, 8 Drawing Figures

4,639,816

MAGNETO-OPTICAL RECORDING MEDIUM

This application is related to copending U.S. patent application Ser. No. 535,699, filed Sept. 26, 1983.

BACKGROUND OF THE INVENTION

1. Field of the Invention

This invention relates to a magneto-optical recording medium to be used for high density magnetic recording and reproduction thereof by the use of a magneto-optic effect.

2. Description of the Prior Art

Recently, in the field of the high density recording of information, a magneto-optical recording medium having erasability or rewritability by the use of the magneto-optic effect has become promising, as compared with fixed or non-erasable type information recording such as by an optical disc.

Conventionally, the reading-out for the magneto-optical recording medium mentioned above has been performed by a reading system such as shown in FIG. 1. In FIG. 1A, denoted by 1 is a light beam; denoted by 2 is a polarizing plate; denoted by 3 is a polarizing beam splitter; denoted by 4 is an objective lens; denoted by 5 is a magnetic film; denoted by 6 is an analyzer; denoted by 7 is a condensing lens; denoted by 8 is a photodetector; and denoted by 9 is a substrate. The magnetic film 5 is formed on the substrate 9 made of a glass, resin or other material, by a process such as sputtering or the like and provides a magneto-optical recording medium in which information is recorded as the changes in the direction of magnetization (for example, upwardly or downwardly), by using, e.g., a method of projecting a laser light beam modulated in accordance with information signals.

The beam 1 is linearly polarized by the polarizing plate 2 and projected onto the magnetic beam 5 through the polarizing beam splitter 3 and the objective lens 4. In accordance with the direction of magnetization of the magnetic film 5, as discussed hereinbelow, the plane of polarization of the beam 1 is rotated in the opposite directions owing to the magneto-optic Kerr effect, and the beam is reflected from the magnetic film 5. If, for example, the plane of polarization of the beam reflected by the downwardly magnetized section is rotated through an angle $\theta k$, the plane of polarization of the beam reflected by the upwardly magnetized section is rotated through an angle $-\theta k$.

If the incident beam is P-polarized light as shown in FIG. 1B, and when the polarized light transmitting direction of the analyzer 6 is disposed in a direction (Q-direction) perpendicular to the above-mentioned polarizing direction $-\theta k$, the reflected light from the upwardly magnetized section is intercepted by the analyzer 6, and the transmission component Δ, through the analyzer 6, of the light reflected from the downwardly magnetized section passes through the analyzer 6.

By detecting this transmission component by means of the photodetector 8, the recorded information is read out.

Since, however, the Kerr rotation angle $\theta k$ owing to the above-described magneto-optic Kerr effect is of the order of 0.1°, the aforesaid transmission component is extremely minute and thus the S/N ratio (Signal-to-Noise ratio) of the reproduction signal detected by the photodetector is so low level that is insufficient particularly in the case of reading of high frequency signals.

In order to overcome such problem, it has already been proposed in, e.g., Japanese Patent Application Laid-Open No. 156943/1981 that a high refractive index thin film layer is provided on the magnetic film and the reflection factor of the magnetic film is made lower, improving the S/N ratio by use of the Kerr enhancement effect by which the Kerr rotation angle $\theta k$ is apparently increased.

In such conventional magneto-optical recording medium, however, the reflection factor of the magnetic film can not be set at a constant value because of, e.g., the fact that the range of reflection factor determined by the material, thickness and etc. of the high refractive index thin film layer is restricted. Further, since the setting of the reflection factor is made without paying attention to noises or the like of the photodetector in the reading system described hereinbefore, a maximum reproduction S/N ratio can not always be obtained, particularly, in the case of using a photodetector having a multiplying function.

SUMMARY OF THE INVENTION

An object of the present invention is to provide a magneto-optical recording medium capable of providing a maximum reproduction S/N ratio when it is used with a reading system employing a photodetector having a multiplying function.

The above object can be achieved by a magneto-optical recording medium which comprises, according to the present invention, a substrate, a magnetic film formed on the substrate and having its axis of easy magnetization oriented perpendicularly to the film surface, and means for establishing a reflection factor of not more than 10% at the surface of the magnetic film.

Other objects and features of the present invention will be apparent from the following descriptions taken in conjunction with the attached drawings.

DESCRIPTION OF THE PREFERRED EMBODIMENTS

Figure 2A:
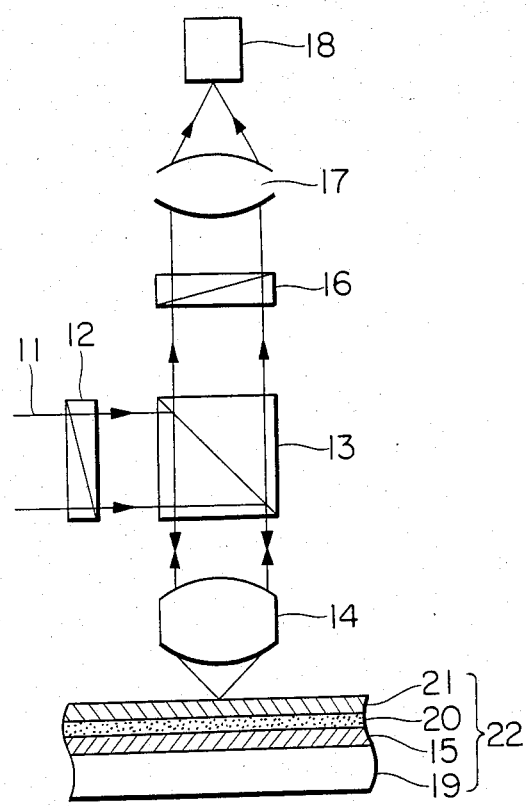
FIGS. 2A and 2B are schematic views showing a reading system for and a layered structure of a magneto-optical recording medium in accordance with a first embodiment of the present invention.

FIG. 2A schematically shows a magneto-optical recording medium according to the present invention and a reading system therefor. In FIG. 2A, denoted by 11 is a light beam; denoted by 12 is a polarizing plate; denoted by 13 is a polarizing beam splitter; denoted by 14 is an objective lens; denoted by 16 is an analyzer; denoted by 17 is a condensing lens; and denoted by 18 is a photodetector having a multiplying function, such as an avalanche photodiode (APD). The magneto-optical recording medium designated by numeral 22 in accordance with the first embodiment of the present invention comprises a substrate 19, a magnetic film 15, a dielectric material regulating layer 20 and a dielectric material alternately-layered structure 21, all of which are superposed to provide a multi-layered structure.

Figure 1A:
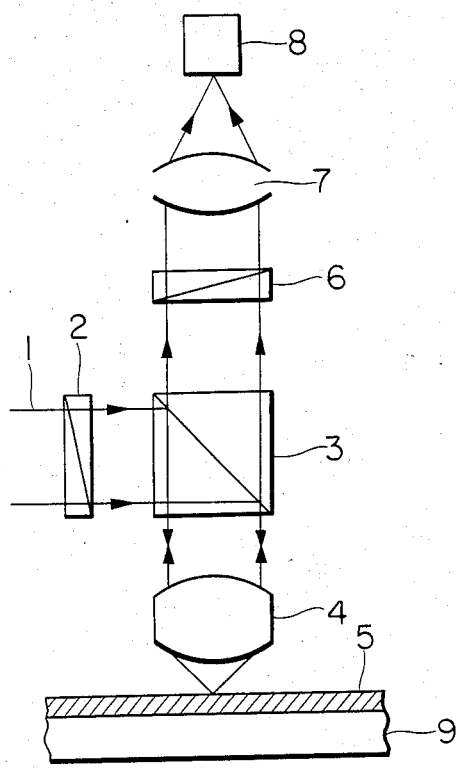
FIG. 1A is a schematic view showing a conventional magneto-optical recording medium and a reading system therefor.
Figure 1B:
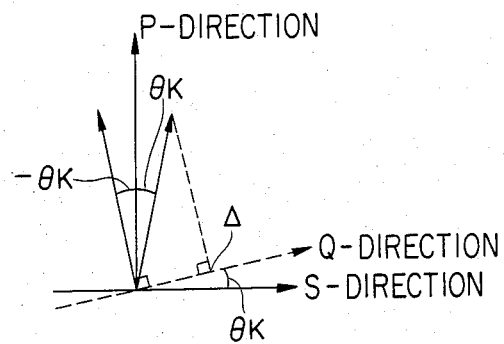
FIG. 1B illustrates the principle of the reading by use of the magneto-optic effect.

Similarly to the FIG. 1A arrangement, the light beam 11 in this embodiment is linearly polarized by the polarizing plate 12 and is projected onto the recording medium 22. The light beam reflected from the recording medium 22 is received by the photodetector 18 by way of the analyzer 16, whereby signal detection is performed. The dielectric material regulating layer 20 and the dielectric material alternately-layered structure 21 are provided in order to regulate the reflection factor of the magnetic film 15 and to maximize the S/N ratio during the reproduction by means of the reading system using the photodetector 18 having the multiplying function.

Figure 2B:
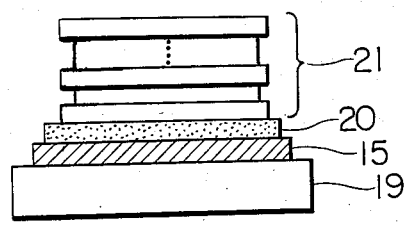

Referring to FIG. 2B, the structure of the recording medium 22 shown in FIG. 2A will be described in more detail. First, on the substrate 19 made of a glass, resin or other material, the magnetic film 15 consisting of an amorphous rare earth transition metal such as GdTbFe, TbFe and etc., or a crystal such as MnBi, MnBiCu and etc. is formed. On the so formed magnetic film 15, a layer of high refractive index dielectric material such as SiO, $ZrO_2$, ZnS, $TiO_2$, $Sb_2O_3$, $CeO_2$ and etc. is formed by using a process such as sputtering, vacuum deposition and the like to provide the dielectric material regulating layer 20. Further, on the regulating layer 20, layers of lower refractive index dielectric material such as $MgF_2$, $SiO_2$ and etc. and layers of higher refractive index dielectric material such as $ZrO_2$, ZnS and etc. are provided in an alternately-layered fashion to form the dielectric material alternately-layered structure 21, whereby the recording medium is provided. The refractive index and the thickness of each of the thus formed dielectric material regulating layer 20 and dielectric material alternately-layered structure 21, or the number of the layers in the dielectric material alternately-layered structure is determined in order to regulate the reflection factor of the magnetic film 15 to a value which maximizes the reproduction S/N ratio in the case of using a photodetector having multiplying function.

Next, description will be made to the method of deriving an optimum reflection factor of the magnetic film which maximizes the reproduction S/N ratio as described above.

Now it is assumed that the direction of polarization of the light beam 11 incident on the recording medium 22 is on the X-axis, while the direction orthogonal to the polarizing direction is on the Y-axis. It is known that, if the magnetic film 15 comprises a perpendicular magnetization thin film whose axis of easy magnetization is perpendicular to the surface of the substrate 19, the refractive index can be approximated as $n = n_o \pm \Delta$ ($n_o$ is the refractive index when the magnetic film is not magnetized, and $\Delta$ is the amount proportional to the magnitude of the magnetization) with respect to the right-handed or clockwisely rotating circularly polarized light (+) and to the left-handed or counterclockwisely rotating circularly polarized light (−) (for example, Journal of Applied Physics Vol. 38, p1482, 1967, by P. S. Pershan). Therefore, the Fresnel reflection coefficient $r_x$ and the Kerr reflection coefficient $r_y$ owing to the magneto-optic Kerr effect, when the light which is linearly polarized in the X-direction is perpendicularly incident on the recording medium 22, can be represented by $$r_x = [r^{(+)} + r^{(-)}]/2 \quad (1)$$

$$r_y = i[r^{(+)} - r^{(-)}]/2 \quad (2)$$

wherein $r^{(+)}$ and $r^{(-)}$ are Fresnel reflection coefficients with respect to the clockwisely rotating circularly polarized light and to the counterclockwisely rotating circularly polarized light, respectively.

Further, since in fact $|n_o| \gg |\Delta|$, we obtain, from the first order approximation with respect to $\Delta$ in the above equations and when $n = n_o$, the following:

$$r_x \approx r \quad (3)$$

$$r_y \approx i\Delta \cdot (dr/dn) \quad (4)$$

wherein r is the Fresnel reflection coefficient upon perpendicular incidence on the recording medium 22 where the refractive index of the magnetic film 15 is n. Therefore, from the above formulae (3) and (4), the Kerr rotation angle $\theta k$ is represented by $$\theta k = \frac{|r_y|}{|r_x|} \cos \delta \quad (5)$$

wherein $\delta$ is the phase difference between $r_y$ and $r_x$.

When the dielectric material of the alternatedly layered structure 21 shown in FIG. 2B comprises $\lambda/4$ multi-layered film having layers of 2N(N=0, 1, ...), we obtain, on the basis of the Fresnel reflection coefficient r of the multi-layered film which can be obtained from the multiinterference theory of the optical thin film, and by using the formulae (3) to (5), the following relation between the power reflection factor $R(= |r_x|^2)$ and the Kerr rotation angle $\theta k$:

$$\theta k = \frac{\alpha}{\sqrt{R}} (1 - R) \cos\delta \quad (6)$$

wherein $\alpha$ is the degree of dependence on the refractive index of the dielectric material regulating layer 20 and the film structure of the magnetic layer 15 and so on. The value $\alpha$ can be maximized when the thickness of the magnetic film 15 is minimized (to of the order of $\lambda/4\pi\kappa$ where $\lambda$ is the wavelength of the reproduction light and $\kappa$ is the extinction coefficient of the magnetic film 15), and when the film structure of the magnetic film 15 and so on is adapted to provide a higher reflection factor.

Where the photodetector is one having no multiplying funciton, such as a PIN photodiode, the thermal noises in the detecting system become dominant, so that the reproduction S/N ratio will be $(S/N) \propto R \cdot \theta k$. Where the detector is one having the multiplying function such as shown in FIG. 2A, shot noises become dominant so that the reproduction S/N ratio will be $(S/N) \propto \sqrt{R} \cdot \theta k$. Therefore, by substituting equation (6) into $\theta k$, we obtain $(S/N) \propto \sqrt{R} (1 - R)\alpha\cos\delta$: thermal noise limit $(S/N) \propto (1 - R)\alpha\cos\delta$: shot noise limit From the above described relation between the reflection factor of the recording medium and the reproduction S/N ratio upon magneto-optic reading, it is seen that there exists an optimum reflection factor which maximizes the S/N ratio. Therefore, in accordance with the type of the photodetector used in the reading system for the magneto-optical recording, one may design the magneto-optical recording medium so as to realize the optimum reflection factor. Although the S/N ratio has dependence on cos δ and cos δ itself which varies with the changes of the reflection factor, such effect can be deleted by inserting a phase difference compensation element such as a λ/4 plate into the optical path of the reproduction light.

Figure 3:
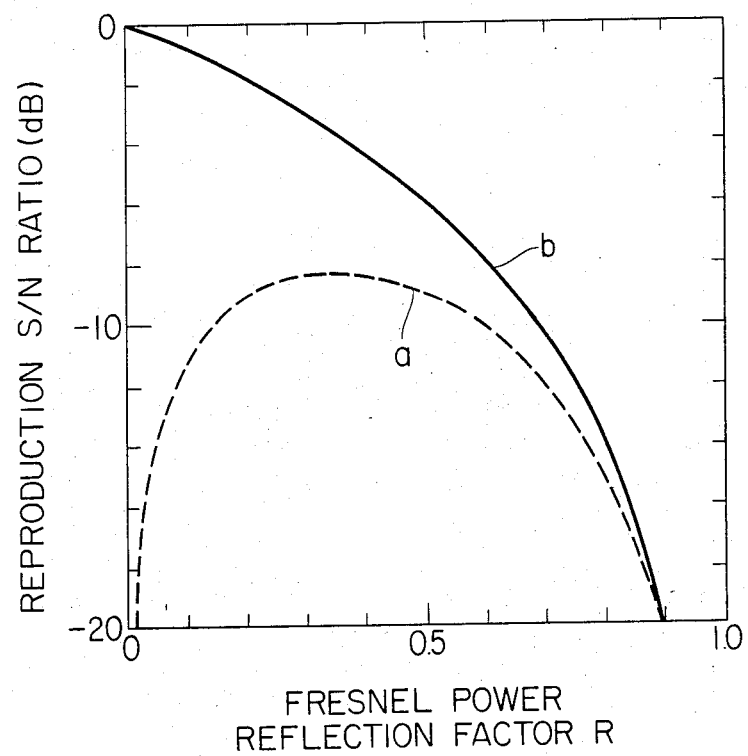
FIG. 3 is a graph showing the dependence of the reproduction S/N ratio in the reading system on the Fresnel power reflection factor of the magneto-optical recording medium.

FIG. 3 shows the dependence of the reproduction S/N ratio on the Fresnel power reflection factor where cos δ is made into "1" by the aforesaid phase compensation. From FIG. 3, it is seen that, where a detector having no multiplying function such as PIN photodiode is used (case "a"), the optimum reflection factor is of the order of 33%; and where a detector having multiplying function such as an avalanche photodiode (APD) is used (case "b"), the reproduction S/N ratio is improved by lowering the reflection factor. If the range of permissible S/N ratio relative to the maximum S/N ratio is −1 dB, the permissible standard for the reflection factor is within the range of 20–50% in the case of PIN photodiode detection and not more than 10% in the case of APD detection. However, also in the case of using the photodetector having no multiplying function, when the intensity of the reproduction light beam is increased, the effect of shot noises becomes notable, and the optimum reflection factor becomes smaller with increasing intensity of the reproduction light beam and approaches to a value obtainable in the case of using a photodetector having multiplying function.

From the above, the reflection factor of the magnetic film in the magneto-optical recording medium according to the present invention is set at not more than 10%. Such low reflection factor can not easily be obtained by conventional magneto-optical recording mediums, but, with the arrangement shown in FIG. 2B, it can easily be realized.

Since the reflection factor so regulated as described above is smaller than the reflection factor of the magnetic film itself, the absorption energy in the magnetic film becomes great which permits reduction of energy in the writing onto the recording medium, thus facilitating the recording of high frequency signals.

Figure 4:
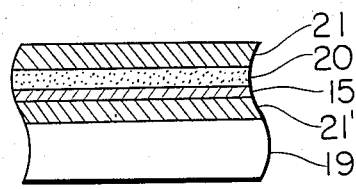
FIGS. 4, 5A and 5B are fragmentary sectional views showing further embodiments of the present invention, respectively.

FIG. 4 shows another embodiment of the magneto-optical recording medium according to the present invention. In FIG. 4, those parts similar to the parts shown in FIG. 2B are denoted by similar numerals. The FIG. 4 embodiment shows a case in which the thickness of the magnetic film 15 is made thin of the order of λ/4πκ. Since, in such case, the Faraday effect which is produced during multiple interference within the magnetic film 15 can also be utilized, detection with a further increased S/N ratio is possible. In order to improve this effect, the present embodiment is arranged so that a dielectric material multi-layered film 21' is formed on the substrate 19 to thereby increase the reflection factor of the magnetic film 15 at its back side facing to the substrate. On the film 21', the magnetic film 15 is formed with such thickness that maximizes the Kerr rotation angle, and a dielectric material regulating layer 20 and a dielectric material alternately-layered structure 21 are formed thereon in the manner which establishes a reflection factor of not more than 10% at the surface of the magnetic film 15, as in the first embodiment. The dielectric material multi-layered film 21' as having the above-described properties can be produced by a known method, such as by, for example, alternate layering of high and low refractive index materials. The dielectric material multi-layered film 21' thus formed has also advantages of providing a heat insulating effect upon writing by laser light and thus improving the writing characteristics.

Figure 5A:
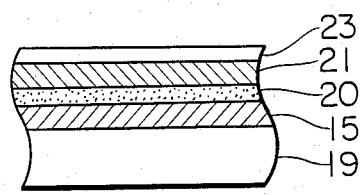
Figure 5B:
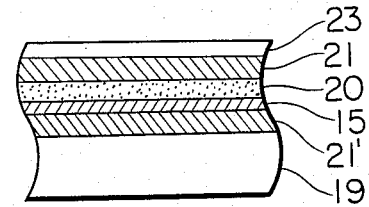

FIGS. 5A and 5B show further embodiments in each of which a transparent protective layer 23 is provided on the recording medium such as shown in FIG. 4. Those parts similar to those shown in FIGS. 2A and 4 are denoted by similar numerals. In this embodiment, it is necessary to design each dielectric material layer while paying attention to the formation of the transparent protective layer 23.

The present invention is not, of course, restricted to the above-described embodiments, and various deformations are within the scope of the present invention. For example, although in the above-described embodiments, the reflection factor is regulated by forming on the magnetic film a dielectric material regulating layer and a dielectric material alternately-layered structure, the latter structure is not necessary where a reflection factor not more than 10% can be realized only by the dielectric material regulating layer.

Further, in the arrangement shown in FIG. 4 or 5B, the dielectric material multi-layered film 21' below the magnetic film 15 may be substituted by such arrangement in which a metallic film such as Al, Au, Ag, Cu and etc. is formed on the substrate 19 and an inorganic film such as $SiO_2$, $MgF_2$ and etc. or an organic film such as methacrylic resin, polycarbonate resin and etc. is formed to have a thickness which increases the reflection factor at the back side of the magnetic film 15 facing to the substrate.

Furthermore, in the arrangements shown in FIGS. 2, 4, 5A and 5B, an additional heat insulating layer may be provided between the substrate 19 and the magnetic film 15 in order to further improve the writing characteristics of the laser light. In such case, however, it is necessary to form this heat insulating layer so as to have λ/2 thickness so as to preserve the conditions for the optimum reflection factor at the back side of the magnetic film 15 facing to the substrate.

What we claim is:

1. A magneto-optical recording medium which is adapted for use in a reading system in which a linearly polarized light beam is projected on said medium whereby a light beam reflected by said medium is detected by a photoconductor, said photoconductor having a multiplying function, said magneto-optical recording medium comprising:

a substrate;
   a magnetic film formed on said substrate, said magnetic film having an axis of easy magnetization perpendicular to the magnetic film surface; and
   a dielectric material layer formed on and in contact with said magnetic film to establish a reflection factor at the magnetic film surface, said reflection factor being about 10% or less.

2. A magneto-optical recording medium according to claim 1, wherein said dielectric material layer comprises a dielectric material regulating layer consisting of a higher refractive index dielectric material, and a dielectric material alternately-layered structure having alternately layered higher and lower refractive dielectric layers.

3. A magneto-optical recording medium according to claim 1, further comprising means for increasing the reflection factor at the back side of the magnetic surface, with respect to the light which has passed through said magnetic film.

4. A magneto-optical recording medium according to claim 3, wherein said means for increasing the reflection factor comprises a dielectric material multi-layered film provided on the back side of said magnetic film and having alternately layered higher and lower refractive index dielectric materials.

5. A magneto-optical recording medium according to claim 1, further comprising a protective layer provided on one side of said magnetic film opposite to said substrate.

6. A magneto-optical recording medium according to claim 1, further comprising a heat insulating layer provided between said substrate and said magnetic film.

* * * * *